United States Patent [19]

Baird

[11] Patent Number: 5,040,965
[45] Date of Patent: Aug. 20, 1991

[54] MOLDING HANDLING AID

[75] Inventor: John Baird, Scottsdale, Ariz.

[73] Assignee: Motorola Inc., Schaumburg, Ill.

[21] Appl. No.: 498,118

[22] Filed: Mar. 23, 1990

[51] Int. Cl.$^5$ ............................................. B29C 33/30
[52] U.S. Cl. .................................... 425/186; 100/918;
425/190; 425/195
[58] Field of Search .................... 425/190, 192 R, 193,
425/195, 186; 100/229 R, 918

[56] References Cited

U.S. PATENT DOCUMENTS

| | | | |
|---|---|---|---|
| 3,229,791 | 1/1966 | Soman | 100/918 |
| 3,422,660 | 1/1969 | Countess, Jr. et al. | 100/918 |
| 3,422,661 | 1/1969 | Blackhurst | 100/918 |
| 3,455,141 | 7/1969 | Bracco et al. | 100/918 |
| 3,986,448 | 10/1976 | Seyfried et al. | 100/918 |
| 4,052,919 | 10/1977 | McKissack | 100/229 R |
| 4,222,726 | 9/1980 | Savage | 425/193 |
| 4,498,384 | 2/1985 | Murphy | 100/918 |
| 4,528,903 | 7/1985 | Lerch | 100/918 |
| 4,731,009 | 3/1988 | Morse | 100/918 |

FOREIGN PATENT DOCUMENTS

| | | | |
|---|---|---|---|
| 2263473 | 7/1974 | Fed. Rep. of Germany | 100/918 |
| 131160 | 6/1978 | German Democratic Rep. | 100/918 |

Primary Examiner—James C. Housel
Attorney, Agent, or Firm—Joe E. Barbee

[57] ABSTRACT

A mold handling aid is provided to assist in moving of a heavy mold on a platen of a mold press. Rollers are placed on the mold itself and engage the platen until the mold reaches its final mounting position on the platen. At this time an air bearing is used to precisely position the mold. In this manner the rollers do not bear any load once a mold is in its final position on the platen.

5 Claims, 2 Drawing Sheets

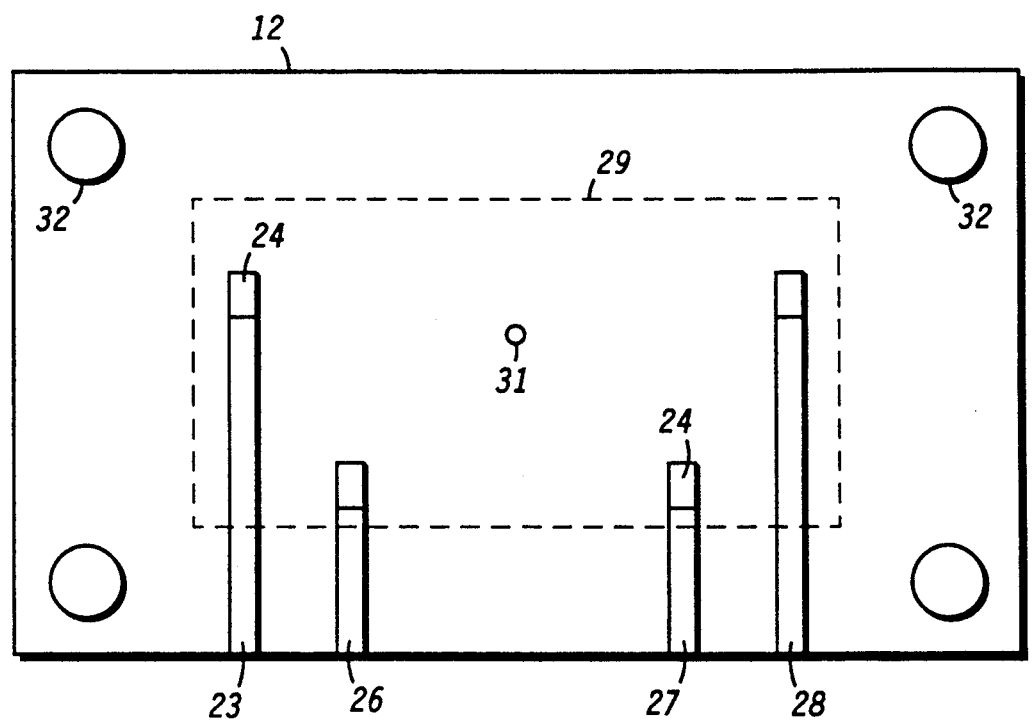
FIG. 2
FIG. 3
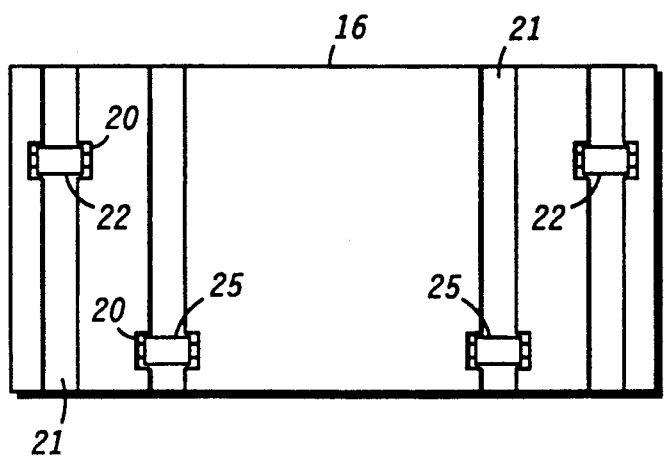

MOLDING HANDLING AID

BACKGROUND OF THE INVENTION

This invention relates, in general, to molds, and more particularly, to an aid for moving a mold on the platen of a mold press.

Many semiconductor devices are encapsulated in a plastic material. The encapsulation process involves the use of a mold and a mold press. Typically the mold comprises two mold halves wherein the mold halves form a plurality of cavities therebetween. The semiconductor devices are placed in the cavities and the plastic encapsulating material is injected into the cavities and cured to encapsulate the semiconductor device. To keep the encapsulating material from escaping from between the two mold halves, the molds are placed in a hydraulically operated press and held together under extremely high pressures. Accordingly, the mold halves are made of metal and typically weigh more than one or two individuals can safely handle.

In the past, the mold was transported to the press on a cart. Some carts were equipped with a roller or roller ball array to facilitate movement of the mold on the cart. The cart was provided with a fence or rail assembly in order to prevent the mold from accidentally rolling off the cart. The cart had a mechanical aid to assist in raising and lowering the height of the cart so that the mold could be easily transferred to a lower platen of a mold press. However, once the mold was on the platen high friction had to be overcome in order to position the mold in the central region of the mold press. Once the mold was near the center of the platen, the mold was floated on an air bearing generated by emitting compressed air to ports near the platen center. This allowed precise manual location of the mold in relation to the mold press features such as the transfer ram. During the positioning of the mold to near the center of the platen various devices such as levers (wooden or metal) were manually used to jockey the mold toward the center of the platen. This consumed considerable amount of manpower and time and usually resulted in scratching or scoring the platen itself.

Accordingly, it is an object of the present invention to provide means for easily moving a mold to a central region of a mold press.

Another object of the present invention is to provide a mold handling aid for moving a heavy mold on a platen of a mold press.

Yet another object of the present invention is to provide means to allow one individual to easily move a large mold on a platen of a mold press.

Yet a further object of the present invention is to provide roller means on a mold which do not interfere with compression of the mold in a mold press.

SUMMARY OF THE INVENTION

The above and other objects and advantages of the present invention are provided by roller means located on a mold to easily move or maneuver the mold on a mold press into a central position. The roller means are positioned in a manner to avoid interference between the bottom of the mold and a platen of the mold press during compression of the mold by the mold press.

In one embodiment of the present invention the roller means are recessed in the bottom of the mold and ride on a raised track positioned on the top of the platen. The raised track or rail delivers the mold to the central region of the platen and then terminates so that once in its proper position the rollers do not engage the raised track.

The subject matter which is regarded as the invention is set forth in the appended claims. The invention itself, however, together with further objects and advantages thereof, may be better understood by referring to the following detailed description taken in conjunction with the accompanying drawings.

BRIEF DESCRIPTION OF THE DRAWINGS

FIG. 2 is a plan view of the lower platen of the mold press of FIG. 1;

FIG. 3 is a bottom view of a mold illustrating the present invention; and

The exemplification set out herein illustrates the preferred embodiment of the invention in one form thereof, and such exemplification is not to be construed as limiting in any manner.

DETAILED DESCRIPTION OF THE DRAWINGS

Figure 1:
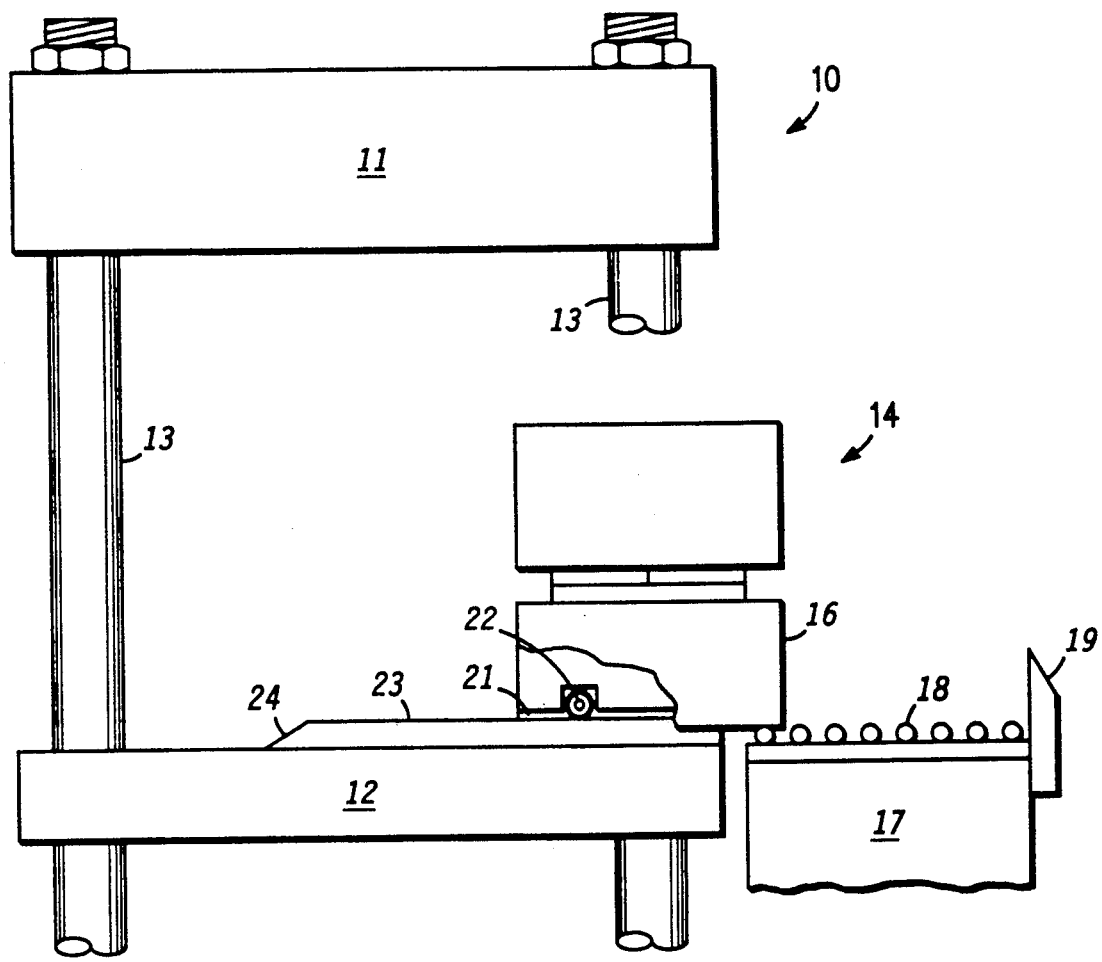
FIG. 1 illustrates the present invention being used on a mold press.

FIG. 1 represents in schematic form one embodiment of the present invention being used on a mold press 10. Mold press 10 has an upper platen 11 and a lower platen 12 being held in a fixed relationship by a plurality of slides or posts 13. Typically, platen 12 is hydraulically pushed upwards towards upper platen 11. Lower platen 12 slides along posts 13 towards upper platen 11. Mold 14 is illustrated as being loaded onto platen 12 off of a cart 17. Cart 17 has a plurality of rollers 18 along which mold 14 is moved. A fence or rail 19 is positioned to keep mold 14 from accidentally rolling off of cart 17.

Mold 14 has a bottom half 16. A portion of mold half 16 is cut away to expose or show groove 21 and roller 22. Groove 21 and roller 22 are recessed in the bottom of mold half 16. Platen 12 has a raised track or rail 23 which fits inside of groove 21 and provides a rolling surface for roller 22. Rail 23 starts at the loading side or edge of platen 12 and extends towards the central region of platen 12 terminating in a shallow angle forming a ramp 24. Once mold 14 is positioned near the center of platen 12 roller 22 comes off the edge of rail 23. Since roller 22 is recessed in the bottom of mold half 16 it will no longer make contact with any portion of platen 12. In this manner the flat bottom of mold 14 will rest directly on platen 12 so that mold press 10 does not exert any pressure on rollers 22. Once in the central region of platen 12 an air bearing will cause mold 14 to float so that precision alignment of mold 14 can then be accomplished.

When it is desired to unload mold 14 from mold press 10 the air bearing is energized thereby causing mold 14 to float and then it can be easily moved into position so that roller 22 once again engages ramp 24 and can be easily moved up on rail 23.

FIG. 2 is a top or plan view of lower platen 12. Holes 32 are to accommodate posts 13. Four rails 23, 26, 27, 28 are shown extending from the loading edge of platen 12 towards the center of platen 12. Dotted lines 29 illustrate where a mold would rest once it is in proper position on platen 12. Rails 23 and 28 are longer than rails 26 and 27, and each of the rails terminates with a ramp 24.

Front rollers on the mold would engage rails 23 and 28 while the rear rollers would engage rails 26 and 27. The rails are positioned on platen 12 in a manner to accommodate multiple sizes of molds. As those experienced in the art will understand some molds are larger than others, and by positioning rails 23, 26, 27, and 28 properly they will accommodate the various sizes of molds. Once the mold is off of rails 23, 26, 27, and 28 an air bearing illustrated by opening 31 is energized and will float the mold thereby making it easy to precisely position the mold in its final position. Rails 23, 26, 27, and 28 can be made from a hard steel strap attached to platen 12 with flush screws.

FIG. 3 is a bottom view of mold 16 having four grooves 21. Each groove or slot 21 has a pocket 20 formed therein to receive a roller. Mold 16 is illustrated as having two front rollers 22 and two back rollers 25. Back rollers 25 are offset from front rollers 22 to permit the rollers to reach the end of their respective rails once the mold is positioned near the center of platen 12. The central portion of mold 22 is left in its natural flat state to provide a surface against which opening or orifice 31 (FIG. 2) can provide air to form an air bearing. Slots or grooves 21 must be approximately one millimeter deeper than the height of rails 23, 26, 27, and 28. Therefore when rollers 22 and 25 reach the end of their respective rails the bottom surface of mold 16 will engage the top surface of platen 12 and rails 23, 26, 27, and 28 can remain within grooves 21 to prevent any load, during the molding process from being placed on rails 23, 26, 27, and 28. Each groove or slot 21 provides approximately 6 millimeter clearance on each side of platen track 23, 26, 27, and 28 to allow for manufacturing tolerance and manual placement of mold 16 up to the loading edge of platen 12. Once mold 16 is placed on platen 12, the tracks will restrain mold 16. However, placing mold 16 on platen 12 from a position on cart 17 (FIG. 1) will require coordinating the tracks with slots 21. When loading mold 16 onto platen 12, rollers 22 will first engage rails 23 and 28 and permit rolling of mold 16 onto platen 12. Rollers 25 will then engage rails 26 and 27 just before mold 16 leaves cart 17.

Figure 4:
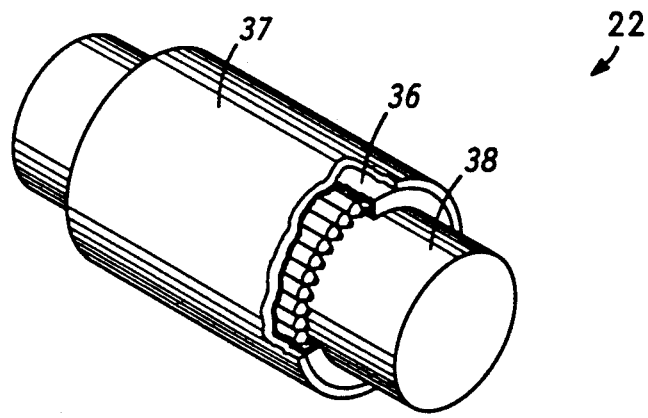
FIG. 4 is a view of the roller assembly used in the present invention.

FIG. 4 is a view of roller assembly 22. Roller assembly 22, in a preferred embodiment, has two needle roller bearings 36 which are enclosed in a sleeve 37. Bearings 36 are mounted on a hardened, polished steel shaft 38. Steel shaft 38 must be retained in pockets 20 formed in slots 21 (FIG. 3) in a manner to prevent shaft 38 from rotating. Sleeve 37 is an outer race and serves as a roller while shaft 38 is an inner race. Suitable bearings 36 can be purchased from Torrington having an office at 59 Field Street, Torrington, CT as part number FJ-912 or equivalent. However, those skilled in the art will realize that any suitable bearing or roller means can be used in the practice of the present invention.

By now it should be appreciated that there has been provided a mold handling aid for moving a heavy mold on a platen of a mold press. The roller means are only engaged by the surface or an extension of the surface of the platen during the positioning process and do not have load bearing contact with the platen once the mold is in its final position on the platen. Accordingly, while the present invention has been described with reference to particular embodiments and exemplifications thereof in accordance with the Patent Statutes, it is to be understood that modifications may be made by those skilled in the art without actually departing from the invention. Therefore, it is intended in the appended claims to cover all such equivalent variations as come within the spirit and scope of the invention.

I claim:

1. A mold handling aid for facilitating movement of a mold, comprising:
   a mold having bearing means for facilitating movement of the mold; and
   a press platen having track means for guidingly engaging the bearing means only to a center region of the platen to permit movement of the mold to the center region at which point the mold rests directly on the platen, the platen further having means at the center region for creating an air bearing between the mold and platen to permit final mold positioning.

2. The mold handling aid of claim 1 wherein the bearing means comprises recessed roller means.

3. The mold handling aid of claim 1 wherein the track means is a raised area on the platen which extends from a loading edge of the platen to the center region of the platen.

4. The mold handling aid of claim 1 wherein the mold has a front side and a back side opposite from the front side, and the bearing means comprises first and second roller means located toward the front side, third and fourth roller means located toward the back side, wherein the first, second, third, and fourth roller means cooperatively facilitate the movement of the mold.

5. The molding handling aid of claim 4 wherein the track means comprises first track means positioned on the platen for mating with the first and the second roller means, and second track means positioned on the platen for mating with the third and fourth roller means, the first and second track means extend inwardly from a loading edge of the platen toward the center region of the platen and wherein the first track means is longer than the second track means and, wherein the inner ends of the first and second track means taper toward the platen.

* * * * *